(12) United States Patent
Chaouk et al.

(10) Patent No.: US 6,663,668 B1
(45) Date of Patent: Dec. 16, 2003

(54) HYDRATABLE SILOXANE COMPRISING POROUS POLYMERS

(75) Inventors: Hassan Chaouk, Brighton (AU); Gordon Francis Meijs, Murrumbeena (AU)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/319,903

(22) PCT Filed: Dec. 11, 1997

(86) PCT No.: PCT/EP97/06936

§ 371 (c)(1), (2), (4) Date: Jun. 14, 1999

(87) PCT Pub. No.: WO98/25982

PCT Pub. Date: Jun. 18, 1998

(30) Foreign Application Priority Data

Dec. 13, 1996 (AU) ............................................. 75336/96

(51) Int. Cl.⁷ .............................. A61F 2/14; A61F 2/16
(52) U.S. Cl. ..................... 623/5.16; 623/6.56; 623/926; 351/160 H; 523/107; 556/467
(58) Field of Search ................. 623/5.16, 6.56, 623/924, 926; 351/160 H; 523/107; 556/467

(56) References Cited

U.S. PATENT DOCUMENTS

| | | | |
|---|---|---|---|
| 5,194,556 A | * 3/1993 | Mueller et al. | 528/28 |
| 5,238,613 A | * 8/1993 | Anderson | 264/22 |
| 5,260,000 A | 11/1993 | Nandu et al. | 264/2.1 |
| 5,282,851 A | * 2/1994 | Jacob-LaBarre | 623/6 |
| 5,981,615 A | * 11/1999 | Meijs et al. | 522/137 |
| 6,197,989 B1 | * 3/2001 | Furukawa et al. | 556/450 |

FOREIGN PATENT DOCUMENTS

| | | |
|---|---|---|
| EP | 0 642 039 A2 | 7/1994 |
| WO | WO 90/07545 | 3/1990 |
| WO | WO 96/31547 | 3/1996 |
| WO | WO 96/31791 | 3/1996 |

* cited by examiner

*Primary Examiner*—Paul Prebilic
(74) *Attorney, Agent, or Firm*—Gardner Groff, P.C.

(57) ABSTRACT

An hydratable porous polymer comprising a polymerized polyorganosiloxane macromonomer of formula I $$Q-[M-L]_c-M-Q \qquad (I)$$

wherein c is in the range of from 0 to 5, preferably in the range of from 0 to 3;

M may be the same or different and is a difunctional block of molecular weight in the range of from 100 to 8000 and wherein at least one M comprises a residue from a difunctional polymer or copolymer comprising siloxane repeat units of formula II

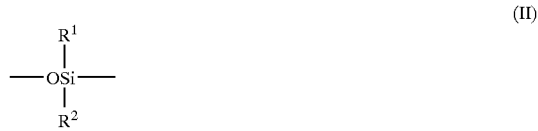

where $R^1$ and $R^2$ may be the same or different and are selected from the group consisting of hydrogen, optionally substituted alkyl, alkenyl, alkynyl, aryl, haloalkyl, haloalkenyl, haloalkynyl, haloaryl, heterocyclyl, and haloheterocyclyl;

L is a difunctional group;

and Q may be the same or different and is a polymerizable group.

17 Claims, No Drawings

HYDRATABLE SILOXANE COMPRISING POROUS POLYMERS

The present invention relates to hydratable porous polyorganosiloxane polymers and to processes for producing such hydratable porous polymers. In particular, the present invention relates to a process for polymerising or copolymerising monomers incorporating polyorganosiloxanes to form hydratable porous polyorganosiloxane polymers, and to articles made of hydratable porous polyorganosiloxane polymers including membranes or ophthalmic devices, e.g. contact lenses.

In many applications it has been found advantageous for polymers to be porous. The degree of porosity required depends on the application. For example, membrane filtration depends on the use of microporous polymers to effect separations of various materials. Macroporous sheets of chemically resistant polymers find extensive use as cell dividers in cells for electrolysis or electricity storage. Macroporous materials (open cell foams) produced through the use of blowing agents are used as cushioning materials. Porous materials have also found use in medicine as the medium for the dispensing of medicinal compounds, in medical implants for cell encapsulation or tissue ingrowth, and to achieve certain mechanical properties such as viscoelasticity.

Pores may be formed in the polymer during the process of manufacturing an article of the desired shape or may be formed in the article after manufacture. For example, U.S. Pat. No. 5,213,721 describes a process where holes are mechanically drilled into a block of matrix polymer and the resulting perforated matrix is subject to repetitive drawing and reconsolidation until the holes are reduced to the desired pore size.

Less commonly, the porosity may be an inherent property of the polymer and the porosity maintained as the polymer is formed into the desired shape for a particular application. It is particularly advantageous for the porosity to be introduced during the polymer forming steps. This is generally economical and, in appropriate cases, good control over the porosity and pore size can be achieved.

Polymers based on polyorganosiloxanes in general have many unique and desirable properties which make these polyorganosiloxane based polymers particularly suitable for a variety of applications. These include outstanding flexibility, transparency, high resistance to temperature extremes, and excellent chemical and oxidation resistance. Polyorganosiloxanes also have a number of desirable membrane and solubility characteristics and are often used in devices that require gas permeability and/or leaching of therapeutic drugs.

Polyorganosiloxane based polymers are highly desirable materials for contact lenses and other ophthalmic devices. The use of these polyorganosiloxane based polymers in such applications is limited by the inability to produce an hydrated porous polymer which would allow transfer of tear fluids or nutrients across a contact lens or other ophthalmic device and retain its transparency. Hydratable porous polyorgano-siloxanes are desirable for other uses which will become apparent based on their properties.

Polyorganosiloxanes are generally noted for their hydrophobicity. Polyorganosiloxanes are commonly used in conferring water repellancy to materials and structures. Bulk polyorganosiloxanes have a very low equilibrium water content and are generally regarded as non-hydratable.

We have now found that it is possible to produce an hydratable porous polyorgano-siloxane based polymer.

Accordingly there is now provided an hydratable porous polymer comprising a polymerized polyorganosiloxane macromonomer of formula I below:

$$Q-[M-L]_c-M-Q \qquad (I)$$

wherein c is in the range of from 0 to 5, preferably in the range of from 0 to 3;

M may be the same or different and is a difunctional block of molecular weight in the range of from 100 to 8000, more preferably from 200 to 8000 and wherein at least one M comprises a residue from a difunctional polymer or copolymer comprising siloxane repeat units of formula II $$\begin{array}{c} R^1 \\ | \\ -OSi- \\ | \\ R^2 \end{array} \qquad (II)$$

where $R^1$ and $R^2$ may be the same or different and are selected from the group consisting of hydrogen, optionally substituted alkyl, alkenyl, alkynyl, aryl, haloalkyl, haloalkenyl, haloalkynyl, haloaryl, heterocyclyl, and haloheterocyclyl;

L may be the same or different and is a difunctional linking group;

and Q may be the same or different and is a polymerizable group.

We have found that the polymer of the present invention is capable of being hydrated to contain a significant amount of water. This water is held within the internal voids in the polymer mass. The water content capable of being maintained by the polymer of the present invention substantially exceeds the water content capability of polyorganosiloxanes. Typically, bulk polyorganosiloxanes exhibit a water content of below 0.3 weight percent (wt %). We have found that the polymers of the present invention generally have water contents (see Examples) of greater than 5 wt %, more preferably of greater than 10 wt % or 15 wt %, and may be produced with water contents of 25 wt % or more. The macromonomer of formula I, preferably, is substantially free and more preferably, is free of perfluoropolyether blocks, which are also called "PFPE" blocks. It is also preferred that all the variables M comprise units of formula II, or more specifically, that all the variables M are of formula III as specified hereinafter.

The polymers of the invention preferably consist of a polymer matrix with interconnecting voids within the polymer matrix. Various pore sizes and morphologies are possible depending upon the polymerization conditions used. The size of individual pores may be up to about 5 microns, with about 100 nanometers being usual, while the smallest diameter pores are generally about 10 nanometers. Usefully, and especially since the porosity is usually of a tortuous path, the porosity of the product may be expressed in terms of permeability to molecules of defined molecular weight.

In a second aspect there is provided a process for producing an hydratable porous polyorganosiloxane polymer comprising the steps of:

i) dispersing a porogen in a continuous monomer component phase wherein said continuous monomer component comprises at least one macromonomer of formula I;

ii) thereafter polymerising the continuous monomer phase; and iii) removing the porogen from the porous polymer.

Hereinafter this will be referred to as the "porogen process".

In a third aspect there is provided a process for the production of an hydratable porous polyorganosiloxane polymer comprising the steps of:

i) forming a mixture comprising a polymerizable component and a solvent wherein the polymerizable component comprises at least one macromonomer of formula I;

ii) polymerizing said mixture wherein immediately after the polymerization of said mixture at least a substantial proportion of said solvent is in the form of a discrete phase and wherein said discrete solvent phase forms an interpenetrating network throughout the mixture or is dispersed throughout the mixture; and iii) removing the discrete solvent phase.

Hereinafter this process will be referred to as the "two-phase process".

Q is a polymerizable group which preferably comprises an ethylenically unsaturated moiety which can enter into a free radical polymerization reaction. Preferably Q is a group of the formula A

$$P_1—(Y)_m—(R'—X_1)_p—$$ (A)

wherein $P_1$ is a free-radically-polymerizable group;

Y is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

R' is a divalent radical of an organic compound having up to 20 carbon atoms;

$X_1$ is —NHCO—, —CONH—, —NHCONH—, —COO—, —OCO—, —NHCOO— or —OCONH—.

A free-radically-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —OCO—.

$X_1$ is preferably —NHCONH—, —NHCOO— or —OCONH—, particularly preferably —NHCOO— or —OCONH—.

In a preferred embodiment, the indices, m and p, are not simultaneously zero. If p is zero, m is preferably 1.

R' is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, R' is a divalent radical having up to 12 carbon atoms, particularly preferably a divalent radical having up to 8 carbon atoms. In a preferred embodiment, R' is furthermore alkylene or arylene having up to 12 carbon atoms. A particularly preferred embodiment of R' is lower alkylene, in particular lower alkylene having up to 4 carbon atoms.

It is particularly preferred that Q be selected from the group consisting of acryloyl, methacryloyl, styryl, acrylamido, acrylamidoalkyl, urethanemethacrylate or any substituted derivatives thereof. Most preferably Q is a compound of formula A wherein $P_1$ is alkenyl of up to 4 carbon atoms, Y is —COO—, R' is alkylene of up to 4 carbon atoms, X, is —NHCOO— and m and p are each one.

In formula I it is preferred that c is in the range of from 1 to 5, more preferably c is in the range of from 1 to 3. Macromonomers where c is 1 are particularly preferred, while macromonomers where c is zero are also preferred.

The macromonomer of formula I may, where c is at least 1, comprise the linking group L. The linking group L may be the bivalent residue of any difunctional moiety able to react with hydroxyl. Suitable precursors to L are α,ω-diepoxides, α,ω-diisocyanates, α,ω-diisothiocyanates, α,ω-diacylhalides, α,ω-dithioacylhalides, α,ω-dicarboxylic acids, α,ω-dithiocarboxylic acids, α,ω-dianhydrides, α,ω-dilactones, α,ω-dialkylesters, α,ω-dihalides, α,ω-dialkylethers, or α,ω-dihydroxymethylamides.

It is preferred that the linking group be a bivalent residue (—C(O)—NH—R—NH—C(O)—) of a diisocyanate or the corresponding residue of a dithioisocyanate wherein R is a divalent organic radical having up to 20 carbon atoms.

The divalent radical R is, for example, alkylene, arylene, alkylenearylene, arylenealkylene or arylenealkylenearylene having up to 20 carbon atoms, a saturated bivalent cycloaliphatic group having 6 to 20 carbon atoms or cycloalkylenealkylenecycloalkylene having 7 to 20 carbon atoms.

In a preferred embodiment, R is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, R is alkylene or arylene having up to 12 carbon atoms or a saturated bivalent cycloaliphatic group having 6 to 14 carbon atoms.

In a preferred embodiment, R is alkylene or arylene having up to 10 carbon atoms or a saturated bivalent cycloaliphatic group having 6 to 10 carbon atoms.

In a particularly preferred meaning, R is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenylene-ethylenephenylene or phenylenemethylenephenylene.

Some examples of preferred diisocyanates from which bivalent residues L are derived include trimethylhexamethylenediisocyanate (TMHMDI), isophorone diisocyanate (IPDI), methylenediphenyl diisocyanate (MDI) and 1,6-hexamethylenediisocyanate (HMDI).

The macromonomer of formula I comprises at least one group M which is a residue from a difunctional polymer or copolymer comprising siloxane repeat units of formula II. The molecular weights and chemical compositions of each M may be the same or different, provided that they fall within the molecular weight range specified above.

The difunctional polymer from which M is derived contains an independently selected terminal functionality at each end which may react with the precursor of the linking group L so that a covalent linkage is formed. The preferred terminal functionality is hydroxyl or amino. Such functionality may be joined to the siloxane units in M by means of an alkylene group or other non reactive spacer. Preferred terminal moieties are hydroxyalkyl, hydroxyalkoxyalkyl and alkylamino. Especially preferred hydroxyalkyls are hydroxypropyl and hydroxybutyl; especially preferred hydroxyalkoxyalkyls are hydroxyethoxyethyl and hydroxyethoxypropyl.

The groups $R^1$ and $R^2$ in the repeat unit of formula II are preferably selected from alkyl or aryl of up to 10 carbon atoms, more preferably from lower alkyl, and are most preferably methyl.

Preferred M residues in formula I as specified above are of formula III

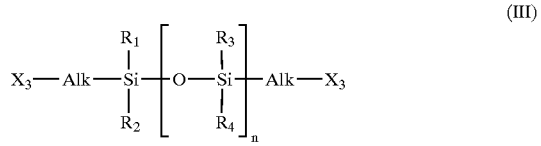

(III)

where n is an integer from 5 to 100; Alk is alkylene having up to 20 carbon atoms, uninterrupted or interrupted by oxygen; the radicals $R_1$, $R_2$, $R_3$ and $R_4$, independently of one another, are selected from the group consisting of alkyl, alkenyl, alkynyl, aryl, haloalkyl, haloalkenyl, haloalkynyl, haloaryl, heterocyclyl, haloheterocyclyl and optionally substituted derivatives thereof, more preferably these radicals are alkyl, aryl or halosubstituted alkyl; and $X_3$ is —O— or —NH—.

In a preferred meaning, n is an integer from 5 to 70, particularly preferably 8 to 50, in particular 10 to 28.

In a preferred meaning, the radicals $R_1$, $R_2$, $R_3$ and $R_4$ are, independently of one another, lower alkyl having up to 8 carbon atoms, particularly preferably lower alkyl having up to 4 carbon atoms, especially lower alkyl having up to 2 carbon atoms. A further particularly preferred embodiment of $R_1$, $R_2$, $R_3$ and $R_4$ is methyl.

Alkylene interrupted by oxygen is preferably lower alkylene-oxy-lower alkylene having up to 6 carbons in each of the two lower alkylene moieties, more preferably lower alkylene-oxy-lower alkylene having up to 4 carbons in each of the two lower alkylene moieties, examples being ethylene-oxy-ethylene or ethylene-oxy-propylene.

Halosubstituted alkyl is preferably lower alkyl substituted by one or more, especially up to three, halogens such as fluoro, chloro or bromo, examples being trifluoromethyl, chloromethyl, heptafluorobutyl or bromoethyl.

Suitable substituents for Q, $R^1$, $R^2$, $R^3$, or $R^4$ may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocycylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

Particularly preferred polymers are those wherein c=0 and M is the residue of an organosiloxane macromonomer of formula (III) of molecular weight in the range of from 248 to 8000, as specified hereinbefore.

The polymerizable component may also include comonomers comprising one or more ethylenically unsaturated groups which can enter into a reaction to form a copolymer. It is preferred that the ethylenically unsaturated group be selected from the group consisting of acrylolyl, methacryloyl, styryl, acrylamido, acrylamidoalkyl, urethanemethacrylate, or any substituted derivatives thereof. Suitable monomers include fluorine- and silicon-containing alkyl acrylates and hydrophilic comonomers, which may be selected from the wide range of materials available to a person skilled in the art, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris(trimethylsilyoxy)propyl methacrylate or acrylate, hydroxyalkyl methacrylates such as hydroxyethyl methacrylate, methacrylic acid, and amine-containing comonomers, such as N,N-dimethylaminoethyl methacrylate, N,N-dimethyl acrylamide and N,N-dimethylaminoethyl-acrylamide. The preferred range for addition of individual comonomers to the macromonomer is from 0 to 60% by weight, most preferably 0 to 40% by weight of the formula. Mixtures of macromonomers of formula I may also be used to make suitable copolymers with or without other comonomers. Other macromonomers (monofunctional or difunctional) may also be incorporated with or without further comonomers.

Further preferred porous polyorganosiloxane polymers are produced by the photoinitiated polymerisation of a formulation containing a bis-isocyanatoethyl methacrylate (IEM) end-capped polydimethylsiloxane of Formula (V), using either the two phase or the porogen processes,

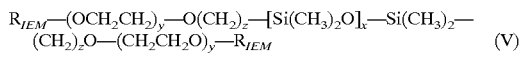
(V)

wherein x, y and z may be the same or different such that the molecular weight of the polydimethylsiloxane is in the range of from 200 to 8,000, and wherein $R_{IEM}$ denotes $CH_2=CH(CH_3)-COO-CH_2CH_2-NH-CO-$.

Most particularly preferred porous siloxane polymers are produced by the photoinitiated polymerisation of a formulation containing the isocyanatoethyl methacrylate (IEM) end-capped polydimethylsiloxane of formula V wherein x=26, y=1 and z=3 (designated as macromonomer 1 hereinafter).

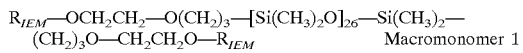
Macromonomer 1

The morphology and porosity of the porous polymer of the invention may be controlled by the processes described in the second and third aspects of the invention. In the porogen process the morphology of the porous polymer may generally be controlled by altering the ratio of the porogen to the macromonomer. An increase in the porogen ratio leads to a higher void volume within the polymer matrix, thereby increasing the probability of the voids being interconnected to form continuous voids from the anterior to the posterior surface of the polymer mass. Low porogen levels can lead to the formation of closed pore structures where the voids are isolated from one another or have low degrees of interconnectivity.

We have found it preferable for the porogen to be liquid at room temperature. Porogens for use in the present invention may be selected from the group consisting of polyols, poly(alkylene)glycols, and polyamines. While polypropyleneglycol is particularly preferred, other polyalkylene glycols such as polyethylene glycols may also be used. The porogens may be of varying molecular weight and are preferably less than 4000 in molecular weight.

The polymerizable component may be mixed with the porogen and other optional components by any convenient means. For example the polymerizable component may be mixed with the porogen and other optional components by shaking or stirring. The order in which the components are added to the mixture is not narrowly critical. The various components which make up the polymerizable component do not need to be combined prior to incorporation in the mixture. The mixture may be in the form of an homogeneous solution or may have the porogen as a distinct phase, such as in the form of a dispersion, emulsion, microemulsion or preferably a co-continuous microemulsion.

Minor amounts of property modifying components may optionally be added to the mixture before polymerization. For example, solvents may be added to control pore size and morphology. Suitable other solvents include ethyl acetate and dimethyl formamide.

Surfactants may be incorporated into the mixture. The use of surfactants is an effective means of controlling the size and density of the pores.

The mixture may be polymerised by any convenient method generally as described hereunder with reference to the initiation of the polymerizable component. Suitable polymerization conditions will be apparent to those skilled in the art. For example, temperatures may range from $-100°$ C. to $350°$ C. and pressures may range from below atmospheric to above atmospheric.

It will be understood that a substantial proportion of the porogen remains in the form of a discrete phase. By this we mean that there is sufficient porogen to form either an interpenetrating network or a dispersion. It will be understood by the person skilled in the art that depending on the polymerization component and the porogen a proportion of porogen may be adsorbed or retained in the polymerizable component and eventually in the porous polymer. Typically more than 60% of the porogen is in the form of a discrete phase immediately after polymerization. It is preferred that greater than 80% of the porogen is in the form of a discrete phase, more preferably greater than 95% of the porogen is in the form of a discrete phase.

It is particularly preferred that the porogen forms an interpenetrating network in the polymerization component resulting in the porous polymer having a reticulated porous morphology. The reticulated porous morphology may be an open-cell, sponge-like structure consisting of interconnected polymer globular particles or may have an open-cell structure with an array of interconnected generally spherical pores.

In another embodiment the porous polymer may be in the form of a closed-cell structure with discrete pores dispersed throughout the polymer.

The porogen may be removed from the porous polymer by any convenient means. Suitable means for removal of solvent include evaporation, exchange with solvents such as isopropyl alcohol and subsequently water or the porogen may be simply washed out of the porous polymer with a suitable solvent such as water or isopropanol.

The process of the present invention is useful for generating materials of various pore sizes and morphologies. The upper limit of average pore size of individual pores is about 5 microns, with 100 nanometres being typical, while pores of around 10 nanometres in diameter may also be obtained.

The pores may form an interpenetrating network. It is more useful to characterise these morphologies in terms of permeability to molecules of defined molecular weight. This is described in the examples.

Particularly useful embodiments of the present method have the porogen phase in the form of a continuous interpenetrating network structure which may be readily extracted to leave a porous material having a reticular network of pores allowing ready passage of fluid and small diameter particles through the porous polymer.

While the size and density of the pores may be controlled by the ratio of the polymerizable component to porogen, minor changes can be effected by the use of surfactants as hereinabove described. The addition of a minor proportion of water also increases porosity.

In the third aspect of the present invention the two phase process also allows for the control of porosity and morphology of the polyorganosiloxane.

The polymerizable component may be mixed with the solvent and other optional components by any convenient means. For example the polymerizable component may be mixed with the solvent and other optional components by shaking or stirring. The order in which the components are added to the mixture is not narrowly critical. The various components which make up the polymerizable component do not need to be combined prior to incorporation in the mixture. The mixture may be in the form of an homogeneous solution or may have the solvent as a distinct phase, such as in the form of a dispersion, microemulsion or preferably a co-continuous microemulsion. The form of the mixture prior to polymerization is not narrowly critical since it is the form of the mixture during polymerization which controls the morphology of the porous polymer.

The solvent may be an organic solvent or water. The organic solvent is preferably selected from the group consisting of short chain alcohols, amines or polyols. The short chain alcohols, amines or polyols may be cyclic, branched or linear; branched chain compounds are particularly preferred. The number of carbon atoms within the short chain compound may be from 1–12; it is preferred however that the number is from 2–8. Isopropyl alcohol, 1-hexanol, 3-hexanol, cyclopentanol, 1,3-propanediol and ethylene glycol are particularly preferred.

The mixture may be in the form of a microemulsion. Microemulsions are thermodynamically stable and essentially transparent two phase systems which are usually stabilised by an interfacial layer of surface-active agents. Microemulsions typically consist of uniform and spherical droplets dispersed in a continuous medium. The particle size is typically of the order of $10^{-2}$ microns. Microemulsions may also exist in a co-continuous structure wherein each phase exists as a continuous interpenetrating network within the other phase.

Minor amounts of property modifying components may optionally be added to the mixture before polymerization. For example, other solvents may be added to control pore size and morphology. Suitable other solvents include ethyl acetate, dimethyl formamide and water.

The polymerization of both the processes of the second and third aspects of the present invention may be initiated by ionizing radiation or by a free radical initiator. It is preferred to employ a free radical initiator such as benzoin methyl ether, azobisisobutyronitrile, benzoyl peroxide, peroxydicarbonates and the like. A particularly preferred free radical initiator is Darocur 1173 (registered trademark of Ciba-Geigy Specialty Chemicals). Free radicals may be formed from the initiator by thermal or photochemical means; redox initiation may also be used.

A preferred process of this third aspect used to generate the porous polymers is the polymerization of a polyorganosiloxane macromer of Formula (I), in the presence of a photoinitiator, a short chain diol (as solvent) and a short chain alcohol surfactant which also acts as a solvent. The pore structure and morphology of the polyorganosiloxane can be significantly altered by manipulating the amount of diol used in the microemulsion. A high diol content produces a membrane structure consisting of fused globular polymer particles separated by large porous channels. These membranes are characterised by their high permeability to Bovine Serum Albumin (BSA) (MW 67,000) and a high water content. In contrast, microemulsions with a small amount of diol produce membranes with a lower pore density leading to a reduction in BSA permeability.

The formulation and polymerisation of the polyorganosiloxane microemulsions may use non-reactive organic solvents, eg. isopropyl alcohol and hexanol, in place of water. Further, the siloxane microemulsion may not require surfactants to enhance the stability of the microemulsion. However, surfactants may be added as an option. Also, the porosity of the resulting polymeric material can be controlled by simply varying the amount of the short chain diol in the microemulsion.

The porous polymers based on polyorganosiloxanes may be manufactured by either of the processes of the second and third aspects which form part of this invention. These processes enable these highly stable and resistant materials to be utilised in porous form. In addition, the processes of the present invention provide siloxane based polymers with a continous pore structure of sufficient dimensions and frequency to allow a flux of high molecular weight biomolecules such as proteins and glycoproteins.

The polymers produced by the process of the invention consist of a polymer matrix with interconnecting voids within the polymer matrix. Various pore sizes and morphologies are available depending upon the polymerization conditions used. The upper limit of average pore size of individual pores is about 5 microns, with 100 nanometres being usual, while the smallest diameter pores generally have a lower limit of around 10 nanometers. More usefully, and especially since the porosity is usually of a tortuous path, the porosity of the product is expressed in terms of permeability to molecules of defined molecular weight.

The second and third aspects of the invention provide processes for the introduction of a continuous pore structure into a polyorganosiloxane based material. In the use as an artificial cornea, porosity is required for the flux of low and high molecular weight nutrients and other components found in tissue fluid. The permeation of nutrients through the implant or onlay is important for the long term viability of any epithelial coverage. The continuous pore structure, coupled with the chemical inertness and excellent chemical properties of siloxane materials also makes these materials suitable for use as filtration membranes and like devices.

According to a further aspect of the present invention there is provided an ophthalmic device, preferably a contact lens, and even more preferred a soft contact lens manufactured from the porous polymers or copolymers as hereinbefore described.

Contact lenses, and also soft contact lenses, are polymer disks with surfaces of differing radii of curvature. The radii are selected in combination with the refractive index of the polymer so that the desired optical correction is obtained and the inner surface of the lens matches the contour of wearer's cornea. They are normally sold in sterile saline. Optionally the surface of the lens may be modified by coating using procedures well known to the art, such as plasma polymerisation, glow discharge or grafting of a more hydrophilic polymer.

The polymers produced according to the present invention may be formed into other useful articles using conventional moulding and processing techniques as are well known in the art. The transparent polymers of the present invention may find use in tissue culture apparatus, optical instruments, microscope slides and the like.

A further aspect of this invention is the use of the porous polymer in film or sheet form as a membrane or a filter. Such porous film may be laminated with another support film to form a composite. Such applications may involve permeability to gases or liquids.

The porous polymers of the present invention are particularly suitable for medical applications such as their use as ophthalmic devices, drug delivery devices, or biomaterials. For example, they have the material properties required for percutaneous access devices, soft tissue implants, implanted glucose monitors, encapsulated biological implants e.g. pancreatic islets, drug delivery patches, contact lenses, sustained release of active compound, immobilised ligands for use in bioreactors or biosensors, wound healing dressings, and biotechnology and biomedical applications including vascular grafts.

The porous polymers of the present invention are also suitable for use as a membrane having a variety of applications including industrial membranes, capacitors, home reverse osmosis, membrane distillation using osmotic pressure, and ultrafiltration in the food, dairy, juice, low alcohol beer industries.

Throughout this specification, unless the context requires otherwise, the word "comprise", or variations such as "comprises" or "comprising", will be understood to imply the inclusion of a stated integer or group of integers but not the exclusion of any other integer or group of integers. The invention will be further described and illustrated by the following non-limiting examples. Temperatures are given in degrees Celsius.

General Polymerization Procedure

The polymerizable formulations were introduced under an inert atmosphere into circular polypropylene moulds (0.2 mm thick, 20 mm diameter) and polymerised by exposure to the radiation from a UV lamp at a wavelength of 350 nm for 3 hours. In the compositions given below all parts are by weight.

The components of the formulations (excluding the initiator Darocur 1173) were added in random order to a glass screw cap vial furnished with a teflon coated magnetic stirrer bar. The glass vial was then placed on a magnetic stirrer plate to allow thorough mixing of the components. After ten minutes the Darocur 1173 was added and mixing continued for a further five minutes. This mixture was carefully dispensed into the bottom half of a polypropylene disk mould (20 mm diameter, 0.2 mm thick) in a nitrogen atmosphere The lid of the mould was then gently put back into place with care being taken to avoid the formation of any gas pockets. This procedure was promptly repeated for the remaining moulds in a series. The filled moulds were then clamped into a frame. The clamped moulds were then removed from the nitrogen atmosphere and placed in a UV curing box consisting of four glass bottom bays which could each accomodate two frames. Underneath the glass base of each bay was two broad spectrum UV lamps with an output of 1.22 mW/cm$^2$. After a three hour polymerisation period the moulds were removed from the UV curing box. Demolding was achieved by opening the mould and carefully peeling off the polymer disk using tweezers with flat rounded ends to minimize tearing of the polymer. The demolded polymer disks were placed in 60 ml screw capped glass jars (ten polymer disks per jar) filled with isopropyl acetate. This begins the extraction procedure which aims to remove any unpolymerised material from the polymer disks. The sealed jars were incubated overnight in a 37° C. water bath. The jars were removed from the water bath and the isopropyl acetate decanted from the polymers. The jars were then filled with isopropanol and placed back in to the water bath. After four hours the isopropanol was decanted from the polymers which were finally stored in ethanol.

The porous polymers below were produced by the general procedure above from the ingredients listed. Macromonomer 1 is a PDMS of molecular weight 2000 made polymerisable by reaction of the silicone with isocyanatoethyl-methacrylate to produce terminal double bonds (formula see hereinbefore). Macromonomer 2 is generally the same, based on a PDMS polymer having a molecular weight of 1000, i.e. a compound of formula V wherein the value of x is correspondingly lower.

The following abbreviations are used:

| | |
|---|---|
| EG: | Ethylene glycol, IPA: isopropanol, |
| Teric G9A8 | Polyethyleneoxide (PEO) based surfactant sold by ICI Australia Operations Pty Ltd, |
| PPG | Polypropylene glycol (Molecular weights = 192, or 725, as shown), |
| HEMA | Hydroxyethyl methacrylate, |
| MACRO 1 | Macromonomer 1, MACRO 2 Macromonomer 2. |

In these examples the two phase and porogen processes for producing porous polymers and the properties of the resulting polymers are illustrated.

EXAMPLE 1

Non-aqueous Microemulsion Process

| Ingredient | MACRO 1 | EG | 1-Hexanol | Darocur 1173 |
|---|---|---|---|---|
| Parts by weight | 39.8 | 22.8 | 34.5 | 0.5 |

EXAMPLE 2

Porogen Process

| Ingredient | MACRO 1 | PPG-192 | IPA | Darocur 1173 |
|---|---|---|---|---|
| Parts by weight | 44.6 | 28.2 | 9.6 | 0.7 |

EXAMPLE 3

Non-aqueous Microemulsion Process

| Ingredient | MACRO 1 | IPA | 1,3-propane diol | 1-hexanol | Darocur 1173 |
|---|---|---|---|---|---|
| Parts by weight | 44.1 | 34.8 | 21.4 | 10.0 | 0.4 |

EXAMPLE 4

Porogen Process

| Ingredient | MACRO 1 | PPG-725 | HEMA | Darocur 1173 |
|---|---|---|---|---|
| Parts by weight | 40.3 | 30.4 | 10.0 | 1.4 |

EXAMPLE 5

Porogen Process

| Ingredient | MACRO 1 | PPG-725 | HEMA | Darocur 1173 |
|---|---|---|---|---|
| Parts by weight | 39.8 | 40.8 | 10.6 | 1.3 |

EXAMPLE 6

Aqueous Microemulsion Process

| Ingredient | MACRO 1 | IPA | Teric G9A8 | Water | Darocur 1173 |
|---|---|---|---|---|---|
| Parts by weight | 40.6 | 6.8 | 32.1 | 20.0 | 1.4 |

EXAMPLE 7

Porogen Process

| Ingredient | MACRO 1 | PPG-725 | Darocur 1173 |
|---|---|---|---|
| Parts by weight | 40.4 | 41.3 | 1.1 |

EXAMPLE 8

Non-aqueous Microemulsion Process

| Ingredient | MACRO 2 | EG | 1-Hexanol | Darocur 1173 |
|---|---|---|---|---|
| Parts by weight | 41.8 | 29.8 | 29 | 0.2 |

EXAMPLE 9

Porogen Process

| Ingredient | MACRO 2 | PPG-725 | IPA | Darocur 1173 |
|---|---|---|---|---|
| Parts by weight | 49.6 | 40.4 | 9.5 | 0.5 |

Polymer Characteristics
Water Content

The water content (% w/w) of the hydrated porous polymers was determined by comparing the hydrated and dehydrated weight of the polymer discs. Dehydration was by overnight drying of the fully hydrated disc in a vacuum oven at 37° C. After the washing procedure described in the general polymerization procedure above, the polymer discs were hydrated via a graded solvent exchange process After 30 min in a solution, the solvent is decanted from the polymer and replaced with the next solvent in the list below. For every 10 polymer discs 60 ml of solvent was used.
Solvent List: 1. 100% Ethanol; 2. 75% Ethanol/water, 3. 50% Ethanol/water, 4. 25% Ethanol/water, 5. 100% Water, 6. 100% Water.

The hydrated membranes are then placed on fine grade Kimwipes paper (Kimberly-Clark) to pat dry the excess surface moisture and finally weighed as the hydrated weight.

$$\% \text{ Water content} = \frac{\text{hydrated weight} - \text{dry weight} \times 100}{\text{hydrated weight}}$$

The water contents of the example polymers are given in Table 1 below:

TABLE 1

Water Content of Example Polymers

| Example No. | 1 | 4 | 5 | 6 | 7 | 8 | 9 |
|---|---|---|---|---|---|---|---|
| Water Content | 34% | 34% | 42% | 50% | 42% | 55% | 28% |

Permeability

The porosity of the product polymers was characterised by their permeability to bovine serum albumin (BSA) or lysozyme measured by the following procedure using a static diffusion cell (i.e. solutions are not stirred).

One hydrated flat 20 mm diameter polymer disk (see water content measurements for hydration procedure) was mounted between two chambers, one containing an 8 mg/ml solution of Bovine Serum Albumin (Molecular weight=67, 000 hereinafter BSA) or lysozyme (Molecular weight=14, 000) in phosphate buffered saline (20 mM phosphate in 0.2 M sodium chloride pH 7.4; hereinafter PBS) while the other chamber was filled with only PBS. At selected time intervals samples were removed from the PBS chamber and the UV absorbance of the solution measured at 280 nm (A 280) to determine whether any protein had diffused through the polymer membrane. A higher absorbance reading points to a higher protein diffusion and is therefore indicative of a structure with a relatively large pore size and/or a larger pore density. The porosity of the example polymers by this method is given in Tables 2 and 3 below.

TABLE 2

Porosity to BSA of Example Polymers

| Example No. | 1 | 2 | 3 | 4 | 5 | 6 | 7 |
|---|---|---|---|---|---|---|---|
| Diffusion Time | 16 h | 24 h | 24 h | 24 h | 24 h | 24 h | 16 h |
| A 280 | 0.593 | 0.272 | 0.589 | 0.182 | 0.317 | 0.572 | 0.153 |

TABLE 3

Porosity to Lysozyme of Example Polymers

| Example No. | 8 | 9 |
|---|---|---|
| Diffusion Time | 24 h | 24 h |
| A 280 | 2.49 | 1.41 |

The claims defining the invention are as follows:

1. A hydratable porous polymer comprising: a polymer matrix and internal voids within the polymer matrix, wherein the internal voids within the polymer matrix is capable of holding an equilibrium water content of greater than 5% by weight, wherein the polymer matrix is a polymerization product of a polyorganosiloxane macromonomer and optionally one or more comonomers having one or more ethylenically unsaturated groups selected from the group consisting of acrylolyl, methacryloyl, styryl, acrylamido, acrylamidoalkyl, urethanemethacrylate, and substituted derivatives thereof, wherein the polyorganosiloxane macromonomer is free of perfluoropolyether blocks and has formula I

$$Q-[M-L]_c-M-Q \qquad (I)$$

wherein c is in the range of from 0 to 5,

M may be the same or different from the other M in formula I and is a difunctional block of molecular weight in the range of from 100 to 8000 and wherein at least one M comprises a residue from a difunctional polymer or copolymer comprising siloxane repeat units of formula II

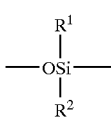
(II)

where $R^1$ and $R^2$ may be the same or different and are selected from the group consisting of hydrogen, alkyl, substituted alkyl, alkenyl, alkynyl, aryl, haloalkyl, haloalkenyl, haloalkynyl, haloaryl, heterocyclyl, and haloheterocyclyl, L may be the same or different from the other L in formula I and is a difunctional linking group, and each Q and is a polymerizable group.

2. A hydratable porous polymer according to claim 1 wherein said polymer has interconnecting voids within the polymer matrix.

3. A hydratable porous polymer of claim 1 wherein c is 0 and M is the residue of an organosiloxane macromonomer of formula III of molecular weight in the range of from 248 to 8000

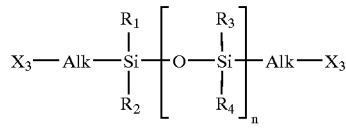
(III)

where n is an integer from 5 to 100; Alk is alkylene having up to 20 carbon atoms, uninterrupted or interrupted by oxygen; the radicals $R_1$, $R_2$, $R_3$ and $R_4$, independently of one another, are selected from the group consisting of alkyl, alkenyl, alkynyl, aryl, haloalkyl, haloalkenyl, haloalkynyl, haloaryl, heterocyclyl, and haloheterocyclyl, and $X_3$ is —O— or —NH—.

4. A process for producing an hydratable porous polyorganosiloxane polymer comprising the steps of:
  i) dispersing a porogen in a continuous monomer component phase wherein said continuous monomer component comprises at least one macromonomer of formula I of claim 1;
  ii) thereafter polymerising the continuous monomer phase; and
  iii) removing the porogen from the porous polymer.

5. A process for the production of an hydratable porous polyorganosiloxane polymer comprising the steps of:
  i) forming a mixture comprising a polymerizable component and an solvent wherein the polymerizable component comprises at least one macromonomer of formula I of claim 1;
  ii) polymerizing said mixture wherein immediately after the polymerization of said mixture at least a substantial proportion of said solvent is in the form of a discrete phase and wherein said discrete solvent phase forms an interpenetrating network throughout the mixture or is dispersed throughout the mixture; and
  iii) removing the discrete solvent phase.

6. A hydratable porous polymer produced according to the process of claim 4.

7. An ophthalmic device comprising a hydratable polymer as defined in claim 1.

8. Artificial cornea comprising a hydratable polymer as defined in claim 1.

9. A hydratable porous polymer produced according to the process of claim 5.

10. The hydratable porous polymer of claim 1, wherein c is in the range of from 0 to 3.

11. The hydratable porous polymer of claim 3, wherein $R_1$, $R_2$, $R_3$ and $R_4$, independently of one another, are selected from the group consisting of alkyl, aryl or halosubstituted alkyl.

12. A contact lens comprising a hydratable polymer as defined in claim 1.

13. A hydratable porous polymer according to claim 1, wherein said porous polymer has a reticulated porous morphology which is an open-cell, structure consisting of interconnected polymer globular particles or an open-cell structure with an array of interconnected spherical pores.

14. A hydratable porous polymer according to claim 1, wherein said porous polymer has a reticular network of pores.

15. A hydratable porous polymer according to claim 1, wherein the internal voids within the polymer matrix is capable of holding an equilibrium water content of greater than 25% by weight.

16. A hydratable porous polymer according to claim 14, wherein the sizes of the pores are from 10 nanometers to 5 microns in diameter.

17. A hydratable porous polymer according to claim 1, wherein said porous polymer has a porosity characterized by its permeability to Bovine Serum Albumin with a molecular weight of 67000 or Lysozyme with a molecular weight of 14000.

* * * * *